US012770654B2

(12) United States Patent
Kojima

(10) Patent No.: US 12,770,654 B2
(45) Date of Patent: Oct. 20, 2026

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Shuuichi Kojima, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/238,916

(22) Filed: Jun. 16, 2025

(65) Prior Publication Data

US 2026/0290396 A1 Sep. 24, 2026

(30) Foreign Application Priority Data

Mar. 18, 2025 (JP) ................................ 2025-043496

(51) Int. Cl.

*G11B 5/60* (2006.01)
*G11B 5/012* (2006.01)
*G11B 7/12* (2012.01)
*G11B 20/10* (2006.01)
*G11B 5/00* (2006.01)

(52) U.S. Cl.

CPC ........ *G11B 20/10481* (2013.01); *G11B 5/012* (2013.01); *G11B 2005/0021* (2013.01)

(58) Field of Classification Search

CPC ..... G11B 7/1263; G11B 5/4866; G11B 5/607; G11B 2020/2001; G11B 5/09; G11B 5/455; G11B 7/00456; G11B 7/1256; G11B 5/6088; G11B 5/6029; G11B 5/59688

USPC .......................................................... 369/75

See application file for complete search history.

(56) References Cited

U.S. PATENT DOCUMENTS

| | | | | |
|---|---|---|---|---|
| 8,854,929 | B1 | 10/2014 | Champion et al. | |
| 9,595,288 | B1 | 3/2017 | Chu et al. | |
| 10,720,177 | B1 | 7/2020 | Ng et al. | |
| 11,456,011 | B2 | 9/2022 | Wessel et al. | |
| 11,961,543 | B2 | 4/2024 | Tatah et al. | |
| 12,002,495 | B2 | 6/2024 | Isokawa et al. | |
| 12,154,606 | B2 * | 11/2024 | Knigge ............... | G11B 5/6088 |

FOREIGN PATENT DOCUMENTS

JP 2024-44496 A 4/2024

* cited by examiner

*Primary Examiner* — Nabil Z Hindi

(74) *Attorney, Agent, or Firm* — Knobbe, Martens, Olson & Bear, LLP

(57) ABSTRACT

According to one embodiment, a magnetic recording device includes a recording medium, a magnetic head including a laser irradiation device that irradiates a laser onto a recording area of the recording medium, a recording element, and a temperature sensor that detects the temperature of the laser irradiation device, and a controller including a temperature management table storing the correspondence between the temperature of the laser irradiation device, a mode hop occurrence temperature and mode hop occurrence location at which mode hopping occurs in a laser output, which manages the write operation of the laser irradiation device and the magnetic head according to the temperature management table.

9 Claims, 10 Drawing Sheets

| Head | Zone | LD temperature | Mode hop occurrence sectors (normal write) | Mode hop occurrence sectors (skipping write 1) | Mode hop occurrence sectors (skipping write 2) | Mode hop occurrence sectors (extended preheat) | Temperature rise in write (temperature rise/sector) | Temperature rise in pause (temperature drop/sector) |
|---|---|---|---|---|---|---|---|---|
| | | 20 | 100 | 300 | 390 | NO | 0.001/sector | 0.0005/sector |
| | | 21 | 110 | 310 | NO | NO | 0.001/sector | 0.0005/sector |
| | | 22 | 120 | 320 | NO | NO | 0.001/sector | 0.0005/sector |
| | | : | : | : | : | : | : | : |
| | | 30 | 200 | NO | NO | YES | 0.001/sector | 0.0005/sector |
| | | : | : | : | : | : | : | : |

FIG. 6

MAGNETIC RECORDING DEVICE

CROSS-REFERENCE TO RELATED APPLICATIONS

This application is based upon and claims the benefit of priority from Japanese Patent Application No. 2025-043496, filed Mar. 18, 2025, the entire contents of which are incorporated herein by reference.

FIELD

Embodiments described herein relate generally to a magnetic recording device.

BACKGROUND

Magnetic recording devices using magnetic heads of the heat-assisted magnetic recording (HAMR) mode have been proposed. HAMR is a technology that increases recording capacity by heating the recording medium with a laser during recording.

In HAMR magnetic recording devices, laser oscillating elements, such as laser diodes, may in some cases generate a mode hop (mode hopping), where the oscillation frequency varies significantly in response to temperature changes or drive voltage changes or the like. When mode hopping occurs, the output of the laser oscillator increases, causing the write width by the magnetic head to become greater than expected. In this case, it is necessary to set the track pitch width by incorporating the write width increased by mode hopping as a margin. This can serve as a factor that reduces the recording density of the recording device.

BRIEF DESCRIPTION OF THE DRAWINGS

FIG. 6 is a diagram showing an example of a temperature management table.

DETAILED DESCRIPTION

Figure 1:
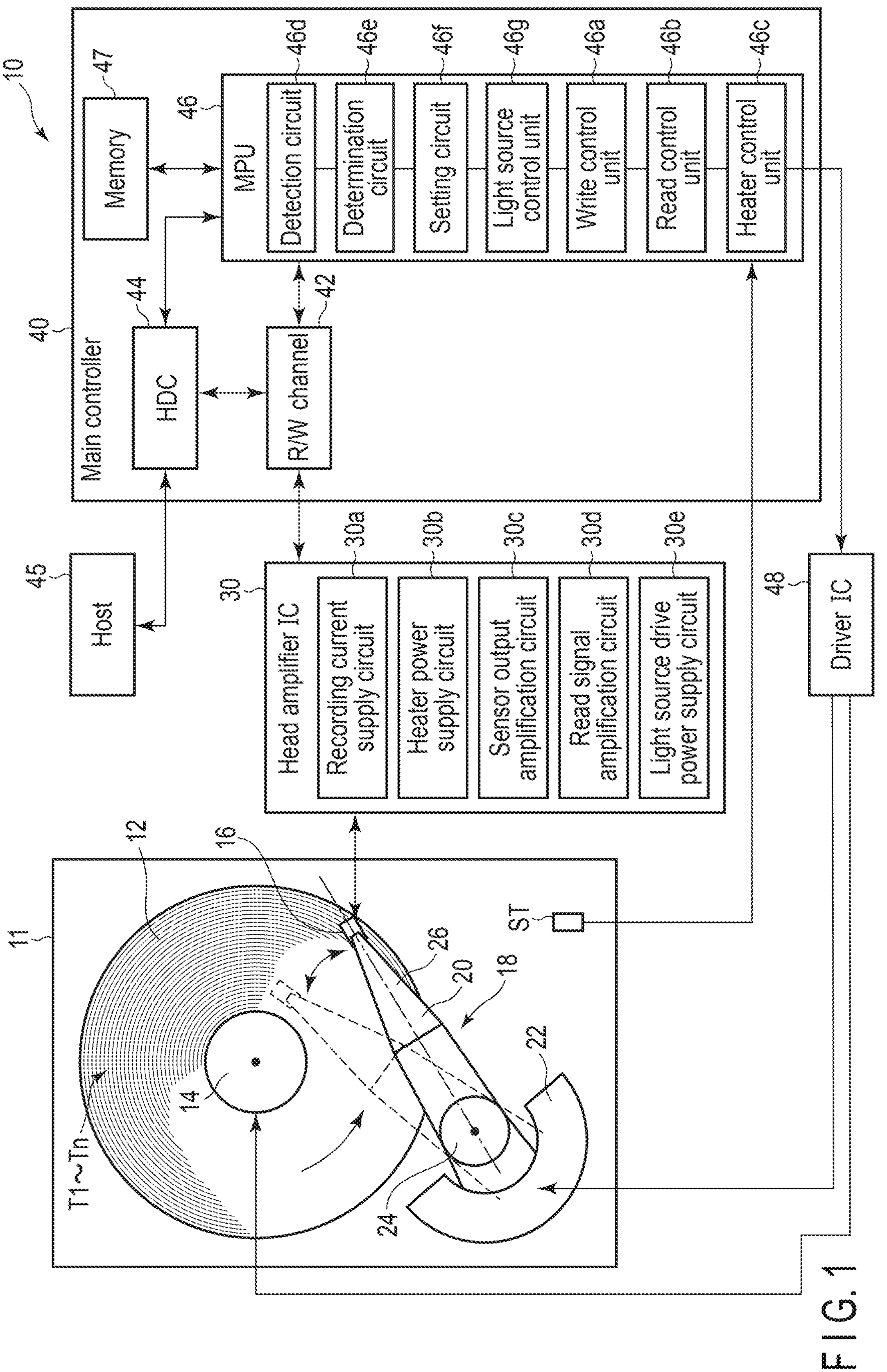
FIG. 1 is a block diagram schematically showing a hard disk drive (HDD) according to an embodiment.

Various embodiments will be described hereinafter with reference to the accompanying drawings. In general, according to one embodiment, a magnetic recording device comprises a disk-shaped recording medium, a magnetic head including a light source which emits a laser, a waveguide, a laser irradiation device which irradiates the laser onto a recording area of the recording medium, a recording element which writes recording data onto the recording area of the recording medium, and a temperature sensor which detects a temperature of the laser irradiation device; and a controller containing a temperature management table which records a correspondence relationship between the temperature of the laser irradiation device, a mode hop occurrence temperature and a mode hop occurrence location at which mode hopping of a laser output occurs, which manages the write operation of the laser irradiation device and the magnetic head according to the temperature management table. The controller comprises a detection circuit which detects an initial temperature of the laser irradiation device at start of the write operation, a determination circuit which determines a temperature difference between the initial temperature and the mode hop occurrence temperature in the temperature management table, a setting circuit which sets a write operation such that the temperature of the laser irradiation device does not reach the mode hop occurrence temperature based on the temperature difference and the temperature management table, and a light source control unit and a write control unit which executes the set write operation.

Note that the disclosure is merely an example, and any appropriate modifications that are easily conceivable by those skilled in the art while maintaining the essence of the invention are naturally included in the scope of the present invention. In addition, the drawings are provided to clarify the explanation, and the width, thickness, shape, etc., of each part may be represented schematically compared to the actual configuration, but these are merely examples and do not limit the interpretation of the present invention. Furthermore, in this specification and the figures, the same reference numerals are used for elements previously described in relation to the preceding figures, and detailed descriptions may be omitted or simplified as appropriate.

First Embodiment

Figure 2:
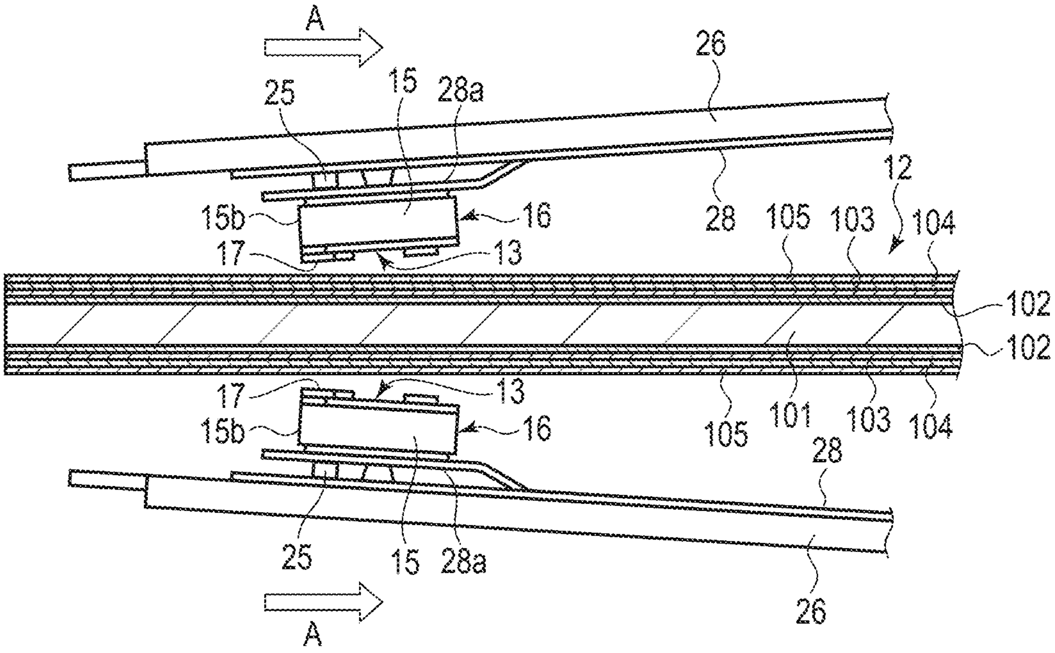
FIG. 2 is a side view schematically showing a magnetic head, a suspension, and magnetic disk of the HDD.

As an example of the magnetic recording device, a hard disk drive (HDD) according to the first embodiment will now be described in detail. FIG. 1 is a block diagram schematically showing a configuration of the HDD according to the first embodiment, and FIG. 2 is a side view showing a magnetic head and a magnetic disk in a flying state.

As shown in FIG. 1, the HDD 10 comprises a rectangular-shaped housing 11, a magnetic disk 12 installed within the housing 11 as a recording medium, a spindle motor 14 that supports and rotates the magnetic disk 12, and a plurality of magnetic heads 16 that perform data recording (write) and reproduction (read) operations with respect to the magnetic disk 12. The HDD 10 comprises a head actuator 18 that moves and positions the magnetic heads 16 on any track on the magnetic disk 12. The head actuator 18 includes a carriage assembly 20 that supports the magnetic heads 16 so as to be movable, and a voice coil motor (VCM) 22 that pivots the carriage assembly 20.

The HDD 10 comprises a controller including a head amplifier IC 30 that drives the magnetic heads 16, a main controller 40, and a driver IC 48. The head amplifier IC 30 is provided in the carriage assembly 20, for example, and electrically connected to the magnetic heads 16. The head amplifier IC 30 includes a recording current supply circuit (recording current supply unit) 30*a* that supplies recording current to the recording coil of the magnetic head 16, a heater power supply circuit 30*b* that supplies drive power to the thermal actuator (heater) of the magnetic heads 16, which will be described later, a sensor output amplification circuit 30*c* that amplifies the detection signal from a heat resistance sensor HR, a read signal amplification circuit 30*d* that amplifies the signals read by the magnetic heads 16, a light source drive power supply circuit 30*e* that supplies drive power to, for example, a laser diode unit (LDU) 25, which serves as the light source, such as a laser oscillator, which will be described later, and the like. When a temperature sensor (for example, a bolometer) is embedded in the magnetic heads, the head amplifier IC may include a sensor drive circuit for driving the temperature sensor.

The main controller 40 and the driver IC 48 are configured on a control circuit board (not shown), which is provided on the rear side of the housing 11, for example. The main controller 40 comprises a read/write channel (R/W channel) 42, a hard disk controller (HDC) 44, a microprocessor (MPU) 46, a memory 47, and the like. The main controller 40 is electrically connected to the magnetic heads 16 via the head amplifier IC 30. The main controller 40 is electrically connected to the VCM 22 and the spindle motor 14 via the driver IC 48. The HDC 44 is connectable to the host computer 45.

In the main controller 40, the MPU 46 includes a write control unit 46*a* which controls the write heads, a read control unit 46*b* which controls the read heads, a heater control unit 46*c* which controls the power supplied to the thermal actuator, a detection circuit 46*d* which detects the temperature of a laser irradiation device LD, which will be described later, a detection circuit 46*d* that detects the temperature of the laser irradiation device LD described later, a determination circuit 46*c*, a setting circuit 46*f* that sets the write operation, a light source control unit 46*g* that controls the drive of the light source, and the like. The write control unit 46*a* and the light source control unit 46*g* execute the write operation set by the setting circuit 46*f*. The memory 47 stores various data including a temperature management table showing the relationship between the LD temperature and the mode hop occurrence location.

As shown in FIGS. 1 and 2, the magnetic disk 12 is configured as a perpendicular magnetic recording medium. The magnetic disk 12 includes a substrate 101 formed of a non-magnetic material into a disk-like shape. On each of the upper and lower surfaces of the substrate 101, a heat sink layer 102, a crystal orientation layer 103, a magnetic recording layer 104 having magnetic anisotropy perpendicular to the surface of the magnetic disk 12, and a protective layer 105 having a surface coated with a lubricant, are sequentially stacked one on another. The crystal orientation layer 103 is provided to improve the orientation of the magnetic recording layer 104.

The HDD 10 includes a plurality of, for example, ten magnetic disks 12. These magnetic disks 12 are coaxially fitted to the hub of the spindle motor 14. The magnetic disks 12 are rotated at a predetermined speed in a direction of the arrow by the spindle motor 14.

As shown in FIG. 1, on each surface (magnetic recording layer) of the magnetic disks 12, a number of concentric recording tracks T1 to Tn are formed. Each of the recording tracks T1 to Tn includes a plurality of sectors arranged in the circumferential direction.

The carriage assembly 20 includes a bearing portion 24 rotatably supported by the housing 11, a plurality of arms and suspensions 26 extending from the bearing portion 24. As shown in FIG. 2, the magnetic head 16 is supported at the extending end of each suspension 26. The magnetic head 16 is electrically connected to the head amplifier IC 30 via a respective wiring member (flexure) 28 provided on the carrier assembly 20.

As shown in FIG. 2, the magnetic head 16 is configured as a flying-type head and includes a slider 15 formed into a substantially rectangular parallelepiped shape and a head portion 17 formed at an end portion of flow-out end (trailing end) 15*b* of the slider 15. The slider 15 is formed, for example, from a sintered body (AlTiC) of alumina and titanium carbide, and the head portion 17 is formed from multiple layers of thin films. The slider 15 is mounted on a gimbal portion 28*a* of the wiring member 28.

The slider 15 has a disk-facing surface (air bearing surface (ABS)) 13, which is substantially rectangular and opposes a surface of the magnetic disk 12, and a rear surface attached to the gimbal portion 28*a*. On the rear surface of the slider 15, a laser oscillator, such as a laser diode unit (LDU) 25, which functions as a light source, is fixed. The slider 15 is maintained in a state where it is flying at a predetermined distance from the surface of the magnetic disk 12 due to the airflow generated between the disk surface and the ABS 13 by the rotation of the magnetic disk 12. As the magnetic disk 12 rotates, the magnetic head 16 moves in the direction of the arrow A (head travelling direction), that is, in an opposite direction to the rotation direction of the disk.

Figure 3:
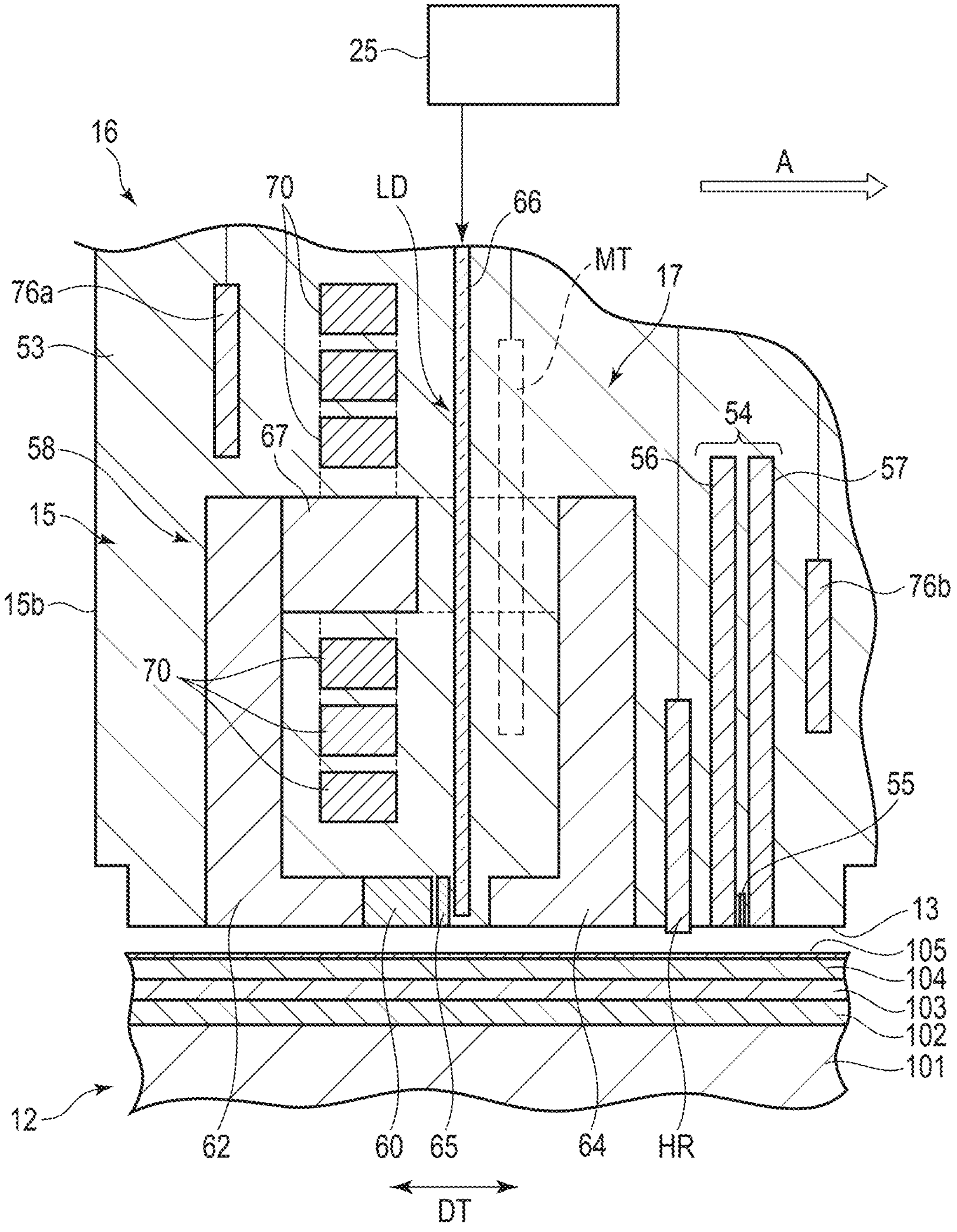
FIG. 3 is a cross-sectional view showing an enlarged view of a head portion of the magnetic head.

FIG. 3 is a cross-sectional view showing an enlarged view of the head portion 17 of the magnetic head 16 and the magnetic disk 12.

As shown in FIG. 3, the head portion 17 has a read head (, which may as well be in some cases referred to as a reproduction element) 54 and a write head (, which may as well be in some cases referred to as a recording element) 58, formed by a thin film process on the trailing end 15*b* of the slider 15. The read head 54 and write head 58 are covered by a non-magnetic protective insulating film 53, except for the portions exposed to the ABS 13 of the slider 15. The protective insulating film 53 forms the outer shape of the head portion 17.

The head portion 17 includes a light-emitting element that irradiates light onto the respective surface of the magnetic disk, here, a near-field light generating element, a waveguide 66 that transmits laser light oscillated by the LDU 25 to the near-field light generating element 65, a heat resistance sensor HR that detects the surface condition (defect condition) of the surface of the magnetic disk, a first thermal actuator (heater 76*a*) that controls the protrusion amount of the read head 58, and a second thermal actuator (heater 76*b*) that controls the protrusion amount of the read head 54. The LUD 25, waveguide 66, and near-field light generating element 65 constitute the laser irradiation device LD.

The magnetic head 16 may comprise a temperature sensor, such as a bolometer MT, installed in the head portion 17. The bolometer MT measures the temperature of the laser irradiation device LD, for example. The measurement data from the bolometer MT is input to the detection circuit 46*d* of the MPU 46 via the head amplifier IC.

The longitudinal direction (circumferential direction) of the recording tracks formed on the magnetic recording layer 104 of the magnetic disk 12 is defined as a track direction DT, and the width direction of the recording tracks perpendicular to the longitudinal direction is defined as a cross-track direction.

The read head 54 includes a magnetic film 55 exhibiting a magnetoresistive effect, and shielding films 56 and 57 arranged so as to sandwich the magnetic film 55 on the trailing side and the leading side thereof. The magnetic film 55 and the shielding films 56 and 57 extend substantially perpendicular to the ABS 13. The lower ends of the magnetic film 55 and the shielding films 56 and 57 are exposed to the ABS 13 of the slider 15.

The write head 58 is provided on the trailing end 15*b* side of the slider 15 relative to the read head 54. The write head 58 includes a main pole 60 that generates a recording magnetic field perpendicular to the surface of the magnetic disk 12, a trailing yoke 62 made of soft magnetic material joined to the trailing side of the main pole 60, which guides magnetic flux to flow to the main pole 60, a return shield pole 64 made of soft magnetic material disposed to oppose he main pole 60 with a write gap on the leading side of the main pole 60, a joint portion 67 that physically join the upper part of the trailing yoke 62 to the return shield pole 64, and a recording coil 70 that allows magnetic flux to flow to the main pole 60.

The tip surface of the main magnetic pole 60, the tip surface of the trailing yoke 62, the tip of the near-field light-emitting element 65, and the tip surface of the return shield magnetic pole 64 are exposed to the ABS 13 of the slider 15.

The main magnetic pole 60 is formed of a soft magnetic material having high permeability and high saturation magnetic flux density, and extends substantially perpendicular to the ABS 13. The main magnetic pole 60 has a tip surface exposed to the ABS 43 and a magnetic end surface extending upward from the ABS 13, that is, in the direction away from the ABS 13, and opposing the near-field light generating element 65.

The near-field light generating element (plasmon generator or near-field transducer) 65 is disposed between the main magnetic pole 60 and the return shield magnetic pole 64, and opposes parallel to the magnetic end face of the main magnetic pole 60 with a gap (gap length) therebetween. An end on the ABS 13 side of the near-field light generating element 65 is formed parallel and flush with the ABS 13.

The near-field light generating element 65 should preferably be formed from an alloy of Au, Pd, Pt, Rh, or Ir, or a combination of some of these.

The waveguide 66 extends from the ABS 13 to the rear surface of the slider 15, that is, the end surface thereof on the suspension side, and is optically connected to the LDU 25. The end portion (extending end portion) on the ABS 13 side of the waveguide 66 is positioned to oppose parallel to the near-field light generating element 65 with a gap therebetween. Between the waveguide 66 and the near-field light generating element 65, an insulating layer is interposed. This insulating layer should preferably be of an oxide such as $SiO_2$ or $Al_2O_3$.

The first thermal actuator includes, as a heating element, for example, a heater 76*a*. The heater 76*a* is embedded within the protective insulating film 53 and located in the vicinity of the write head 58. The second thermal actuator includes, as a heating element, for example, a heater 76*b*. The heater 76*b* is embedded within the protective insulating film 53 and located in the vicinity of the read head 54.

The recording coil 70 is connected to the head amplifier IC 30 via a wiring line (not shown) and a flexure 28. When writing a signal to the magnetic disk 12, a recording current is supplied from the recording current supply circuit 30*a* of the head amplifier IC 30 to the recording coil 70, thereby exciting the main pole 60 and causing a magnetic flux to flow to the main pole 60. The recording current supplied to the recording coil 70 is controlled by the write control unit 46*a* of the main controller 40.

The read head 54 is connected to the head amplifier IC 30 via a wiring line (not shown) and the flexure 28. The signal read by the read head 54 is amplified by the read signal amplification circuit 30*d* of the head amplifier IC 30 and sent to the main controller 40.

The first heater 76*a* and the second heater 76*b* are connected to the head amplifier IC 30 via respective wiring lines and the flexure 28. Here, by applying drive power from the heater power supply circuit 30*b* of the head amplifier IC 30 to the first heater 76*a* and the second heater 76*b*, the heater and the surrounding area thereof are heated, making it possible to cause the write head 58 or the read head 54 to swell toward the magnetic disk 12. In other words, by adjusting the swelling amount, the flying amount of the magnetic head 16 can be adjusted. The heater power supplied to the first heater 76*a* and the second heater 76*b* is controlled by the heater control unit 46*c* of the main controller 40.

The heat resistance sensor HR is used as an example of HDI (head-disk interface) sensors. The heat resistance sensor HR is connected to the head amplifier IC 30 via a wiring line and the flexure 28. The detection signal (sensor output) from the heat resistance sensor HR is amplified by the sensor output amplification circuit 30*c* of the head amplifier IC 30 and sent to a detection circuit 46*d* of the main controller 40.

Further, the heat resistance sensor HR can be heated by supplying a drive voltage thereto to function as a heater. For example, in the preheating operation, which will be described later, the laser irradiation device LD can be preheated (preliminarily heated) using the heat resistance sensor HR.

The LDU 25 is connected to the head amplifier IC 30 via a wiring line (not shown) and the flexure 28. By applying drive power from the light source drive power supply circuit 30*e* of the head amplifier IC30 to the LDU 25, the LDU 25 oscillates laser light. The laser light is input into the waveguide 66 and supplied to the near-field light generating element 65 through the waveguide 66. The drive power supplied to the LDU 25 is controlled by the light source control unit 46*g* of the main controller 40.

The bolometer MT is connected to the head amplifier IC30 via a wiring line and the flexure 28. The detection signal (measured temperature data) from the bolometer MT is amplified by, for example, the sensor output amplification circuit 30*c* of the head amplifier IC30 and sent to the detection circuit 46*d* of the main controller 40.

As shown in FIG. 1, according to the HDD 10 configured as described above, when the VCM 16 is driven, the head actuator 18 is pivoted, and the respective magnetic head 16 is moved to and is positioned on the desired track of the magnetic disk 12. As shown in FIG. 2, during operation of the HDD 10, the magnetic head 16 is located to oppose the disk surface with a gap maintained therebetween. The magnetic head 16 flies in a tilted posture such that the write head 58 portion of the head portion 17 is closest to the surface of the magnetic disk 12. While maintaining this state, the read head 54 reads recorded information from the magnetic disk 12, and the write head 58 writes information (signals) to the magnetic disk 12.

Figure 4:
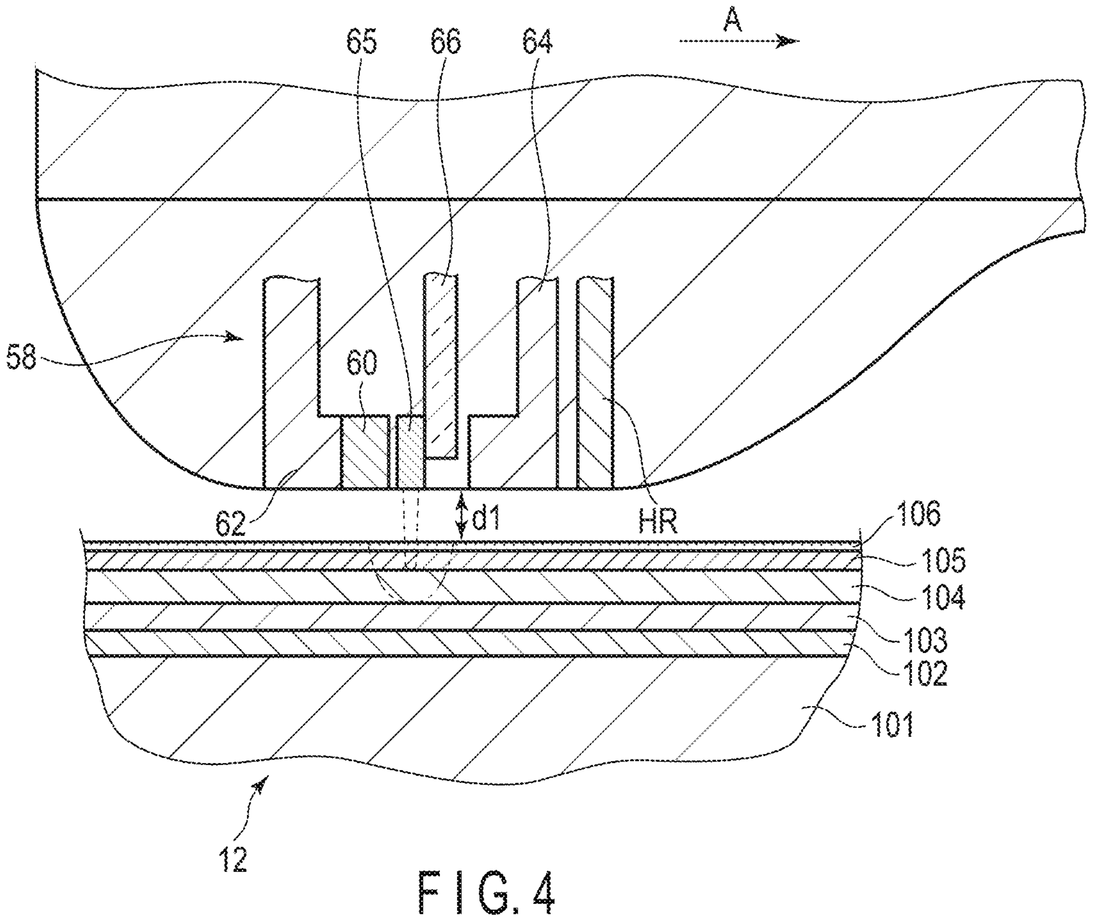
FIG. 4 is a diagram schematically showing the head portion of the magnetic head in a state where the write head portion is protruded by a thermal actuator.

FIG. 4 is a cross-sectional view schematically showing a part of the head portion 17 of the magnetic head 16 and the magnetic disk 12 during write operation.

As shown in FIG. 4, during the write operation of the magnetic head 16, driving power is applied to the first heater 76*a*, and thus the first heater 76*a* and its surrounding area is heated up. As a result, a portion of the write head 58 protrudes toward the magnetic disk 12. For this reason, the gap (head flying amount) d1 between the write head 58 and the surface of the magnetic disk 12 is set to approximately 1 nm.

In writing of information, the main magnetic pole 60 is excited by the recording coil 70, and thus a recording magnetic field perpendicular to the magnetic recording layer 104 of the magnetic disk 12 is applied directly below, thereby recording the information at the desired track width. Meanwhile, in heat-assisted magnetic recording, laser light is applied from the LDU 25 through the waveguide 66 onto the near-field light generating element 65 during writing of information, and thus near-field light is generated from the near-field light generating element 65. With the near-field light generated from the tip of the near-field light generating element 65, the magnetic recording layer 104 of the magnetic disk 12 is locally heated and thus the coercive force in the recording region is reduced. To this region where the coercive force has been reduced, a recording magnetic field from the main magnetic pole 60 is applied and the signal is written. As described, the magnetic recording layer 104 is locally heated to sufficiently reduce the coercive force in the region and recording data is written in the region where the coercive force has been reduced, thereby making it possible to achieve high-density recording.

On the other hand, in heat-assisted magnetic recording, a mode hop may occur in which the laser output changes abruptly in response to changes in the temperature of the laser irradiation device LD. Under these circumstances, the HDD 10 according to this embodiment is configured to manage the write operation of the magnetic head 16 in response to temperature changes of the laser irradiation device LD in order to suppress the occurrence of mode hops. Now, the write operation of the magnetic head 16 will be described in detail.

Figure 5:
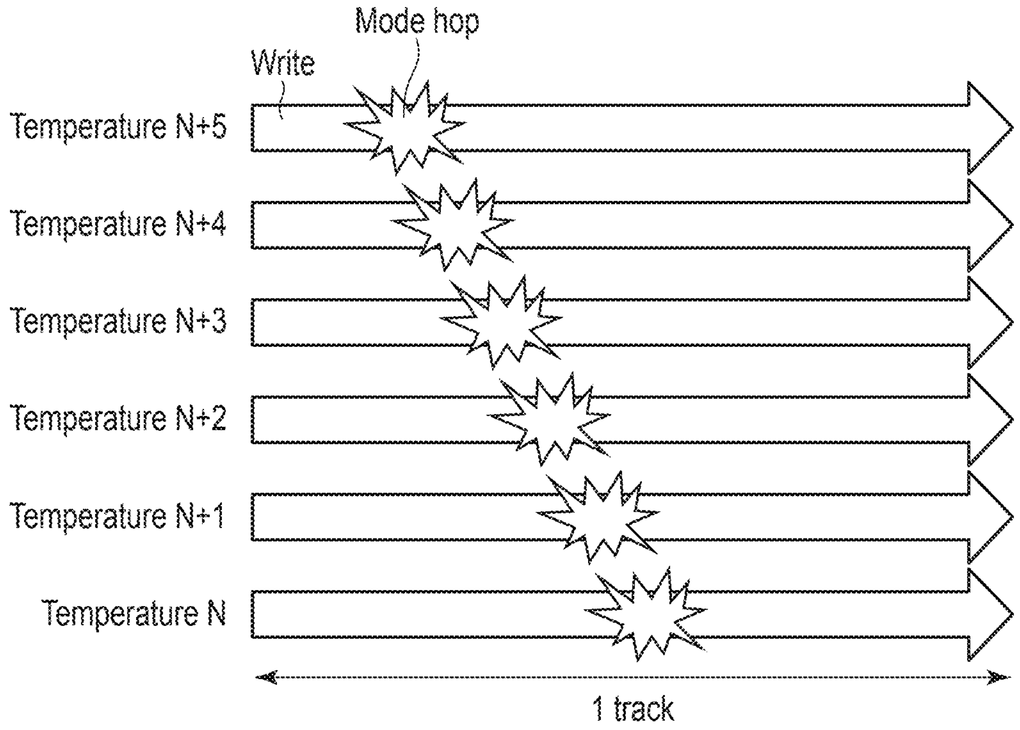
FIG. 5 is a diagram showing the relationship between the temperature of the magnetic head and the mode hop occurrence location.

FIG. 5 is a diagram showing the relationship between the temperature of the laser irradiation device LD (, which will be referred to as LD temperature) and the sector position where mode hopping occurs during the write operation. In this embodiment, the LD temperature of the laser irradiation device LD is the temperature measured by the bolometer MT, which is different from the sensor temperature (drive temperature) inside the housing 11, measured by the temperature sensor ST.

As shown in FIG. 5, the mode hop occurrence location moves toward the sector on the upstream side of the track as the LD temperature rises. In other words, as the LD temperature is higher, the mode hop occurrence location moves closer toward the start location of the write operation.

The main controller 40 of the HDD 10 according to this embodiment detects the mode hop occurrence location (occurrence sector) corresponding to the LD temperature in advance, creates a temperature management table indicating the relationship between the LD temperature and the mode hop occurrence sector at the time of occurrence of the mode hopping, and stores it in the memory 47.

FIG. 6 is a diagram showing an example of the temperature management table. As shown in the figure, the temperature management table lists the relative relationship between the LD temperature of the laser irradiation device LD at the time of occurrence of mode hopping (, which may as be in some cases referred to as the mode hop occurrence temperature) and the mode hop occurrence sector in various types of write operations, which will be described later.

A method of detecting the relative sector position where mode hopping occurs will now be described.

Figure 7:
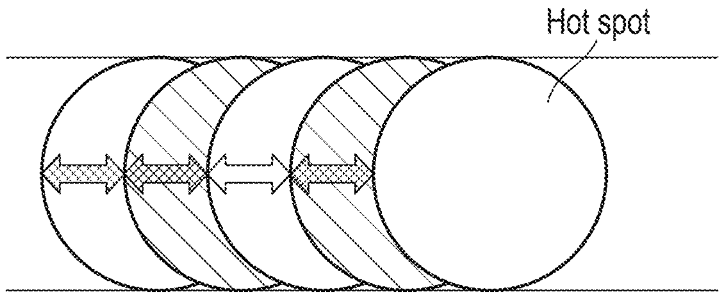
FIG. 7 is a plan view schematically showing the movement state of a hot spot of the laser light.
Figure 8:
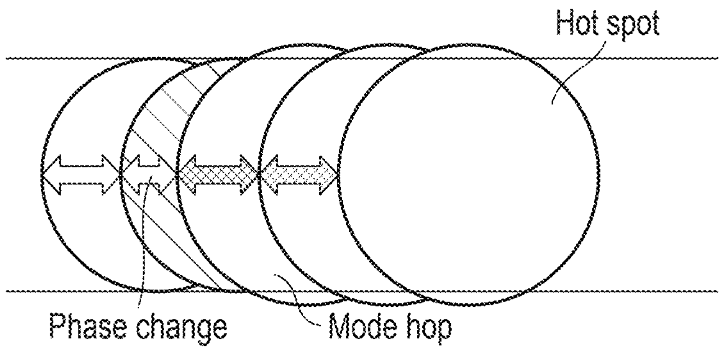
FIG. 8 is a plan view schematically showing the movement state of the hot spot of the laser light including phase changes.
Figure 9:
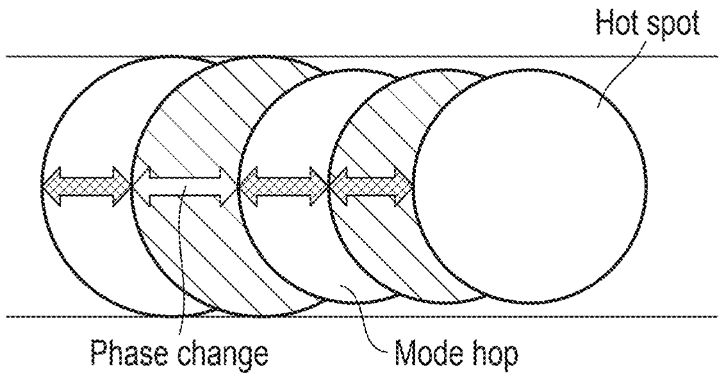
FIG. 9 is a plan view schematically showing the movement state of the hot spot of the laser light including phase changes.

FIG. 7 is a diagram showing a column of hot spots written in a single pattern, FIG. 8 is a diagram showing a column of hot spots when mode hopping occurs, and FIG. 9 is a diagram showing a column of hot spots when mode hopping occurs.

First, a single pattern is written to one track of the magnetic disk 12. When the written pattern is read out, a pattern of a constant period (hot spot column) is read out as shown in FIG. 7.

When mode hopping occurs during writing, the phase of the read pattern shifts, that is, a phase change occurs. This is because the area heated by the laser (hot spot) shifts forward or backward during mode hopping. When the laser output increases due to mode hopping, the bit interval of the read pattern narrows as shown in FIG. 8, and the phase becomes faster. When the laser output decreases due to mode hopping, the bit interval of the read pattern widens, and the phase becomes slower as shown in FIG. 9.

When the read pattern is subjected to discrete Fourier transform at regular intervals, or the phase shift is measured using a harmonic sensor or the like, it is possible to detect the location where there is a phase shift, as the location where mode hopping has occurred (sector) if a phase shift occurs. By detecting in which sector this phase change occurs after starting the write operation, it is possible to identify the relative sector position where mode hopping occurs.

The main controller 40 detects the relative sector positions at various LD temperatures and creates a temperature management table (see FIG. 6) that shows the relative relationship between the LD temperature at the time of occurrence of mode hopping and the mode hop occurrence sector. The temperature management table thus created is stored in the memory 47.

As shown in FIG. 6, in an example of the temperature management table, multiple write operation modes and the relationship between the mode hop occurrence temperature (LD temperature) and the mode hop occurrence sector (sector number) for each write operation mode are recorded. In the temperature management table, the following write operation modes are recorded, for example: normal write operation (normal write), the skipping write operation (skipping write 1), which will be described later, the skipping write operation (skipping write 2), to be described later, and the write operation after preheating (extended preheating), to be described later.

In the temperature management table, mode hop occurrence sectors are recorded, in which the relative sector positions where mode hopping occurs when one track is continuously written for each magnetic head equipped with a laser irradiation device LD, with respect to each LD temperature are checked in advance, and the sectors where mode hopping occurs after the write operation starts are recorded as mode hop occurrence sectors.

For example, When the LD temperature (mode hop occurrence temperature) is 20 degrees, in normal write operation, a mode hop occurs at the 100th sector, in skipping write 1, a mode hop occurs at the 300th sector, in skipping write 2, a mode hop occurs at the 390th sector, and in extended preheat write operation, no mode hop occurs (NO), as so recorded.

Further, in the temperature management table, the LD temperature rise rate (temperature rise/sector) for each sector during write operation and the LD temperature drop rate (temperature drop/sector) for each sector during write standby are recorded.

According to this embodiment, the main controller 40 manages the write operation of the HDD 10 based on the management table described above.

At the start of the write operation, the main controller 40 detects the LD temperature at the start of the write operation using the detection circuit 46*d*, and the determination circuit 46*e* calculates the temperature difference between the mode hop occurrence temperature (LD temperature) in the temperature management table and the detected LD temperature at the start of the write operation. The setting circuit 46*f* selects one of the write operations (skipping write 1, skipping write 2, extended preheat, or write operation using write duty) that can avoid the occurrence of mode hopping from the temperature management table based on the temperature difference, and sets the write operation. The main controller 40 executes the set write operation.

When the mode hop cannot be avoided by any of the write operations, the main controller 40 either performs write operation on an alternative area using another magnetic head or temporarily stores the recording data in the memory 47 and starts write operation when the LD temperature changes and recovers the writeable condition.

The write operation mode of the HDD 10 according to this embodiment will now be described.

(Skipping Write 1)

Figure 10:
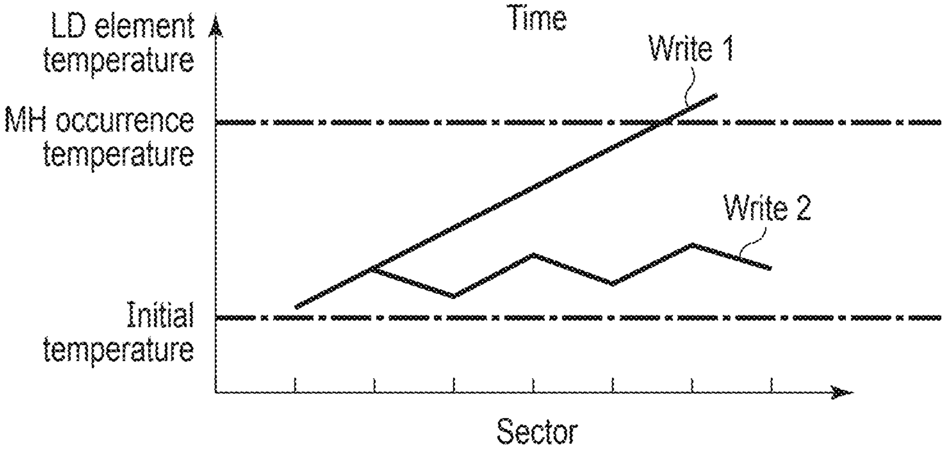
FIG. 10 is a diagram showing the relationship between the light source, the light-emitting element temperature, and the recording sector in sector-skipping write.
Figure 11:
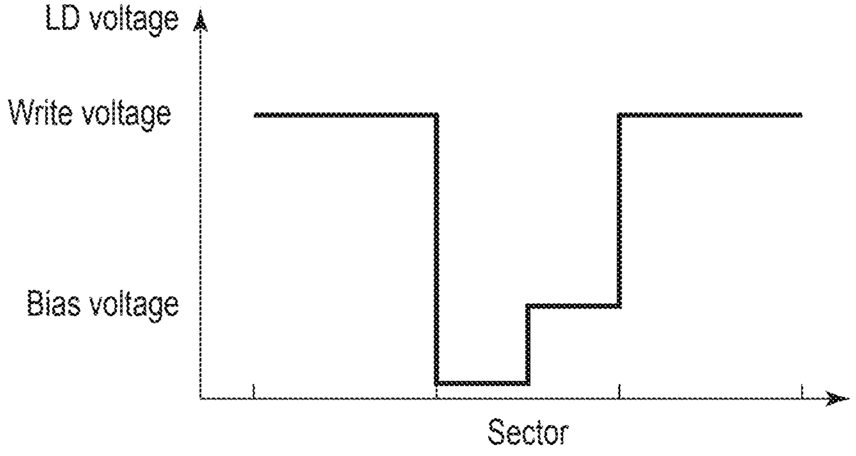
FIG. 11 is a diagram showing the relationship between the drive voltage of the light source and the sector in sector-skipping write.

FIG. 10 is a diagram showing the relationship between the LD temperature and the sector position in the skipping write operation (Skipping Write 1), and FIG. 11 is a development diagram schematically showing a track T1 where the recording data is written by a skipping manner.

At the start of the write operation, the main controller 40 compares the LD temperature detected by the bolometer MT with the mode hop occurrence temperature. As shown in FIG. 10, when the LD temperature (initial temperature) at the start of the write operation is sufficiently lower than the mode hop (MH) occurrence temperature, for example, when the temperature difference is 1° C. or more, the main controller 40 selects the skipping write 1 from the temperature management table as the write operation for avoiding the occurrence of mode hopping and executes the skipping write operation (solid line, write 2). When writing recorded data to one track, the writing is continuously performed on sectors that are normally arranged consecutively. In that case, as indicated by the solid line, write 1 in FIG. 10, when the LD temperature gradually rises and then reaches the mode hop occurrence temperature, causing a mode hop to occur.

In contrast, in the write operation of the skipping write 1 of this embodiment, the sectors are skipped and the recording data is intermittently written to one track T1. For example, as shown in FIG. 11, in the first rotation of the magnetic disk 12, one sector is written, followed by a pause of one sector. This process is repeated until the rotation around the one track is completed. Next, in the second rotation, recording data is written to the sectors that were not written during the first rotation.

As indicated by the solid line and write 2 in FIG. 10, according to the skipping write 1, the LD temperature rises during the execution of the sector write operation due to the influence of laser oscillation and write current. On the other hand, in the write pause sectors, a drive voltage that causes the laser output to become zero is applied, or no drive voltage is applied. Further, no write current flows in the pause sectors. Therefore, in the write pause sectors, the laser irradiation device LD is cooled, and the LD temperature is lowered. By repeating this cycle of temperature increase and decrease, the increase in LD temperature is suppressed even after executing two rotations of write operations. As a result, the LD temperature is managed to be prevented from reaching the mode hop occurrence temperature, thereby making it possible to suppress the occurrence of mode hopping.

FIG. 11 is a diagram indicating the LDU drive voltage during write operation and the LD drive voltage during pause of write operation in the skipping write operation. In FIG. 11, the bias voltage is the maximum voltage at which no laser output is generated even when the drive voltage is applied to the LDU 25. In other words, the bias voltage is the threshold voltage at which the LDU 25 begins laser oscillation.

As shown in FIG. 11, during the skipping write operation, the main controller 40 sets the LDU drive voltage for the sector to be written to a write voltage, and sets the LUD drive voltage for the sector to be paused in write operation to a bias voltage or below during a part or entirety of the write pause zone. Thus, the laser oscillation is stopped during the write pause, and thus the cooling effect caused by the write pause can be enhanced.

(Skipping Write 2)

Figure 12:
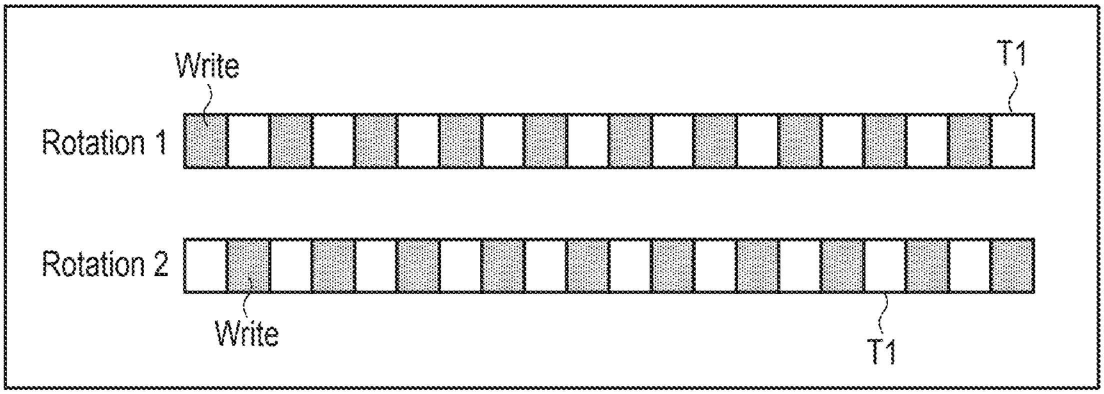
FIG. 12 is a plan view schematically showing the recording track in sector-skipping write.

FIG. 12 is a development diagram schematically showing a track on which recording data is written in a skipping-out manner during the skipping write operation (skipping write 2).

When the temperature difference between the LD temperature at the start of the write operation (initial temperature) and the mode hop occurrence temperature is small, for example, within a range of approximately 0.5° C., the main controller 40 selects the skipping write 2 from the temperature management table as the write operation for avoiding the occurrence of mode hopping, and executes the skipping write operation.

As shown in FIG. 12, in the skipping write operation (skipping write 2), one sector is written, followed by a pause of two sectors. This is repeated until the rotation of one track is completed. In the second rotation which follows, recording data is written to the sectors that have not been written in the first rotation. In the third rotation, recording data is written to the sectors that have not been written in either the first or second rotation.

In the skipping write 2, since the number of skipped sectors is greater than that of the skipping write 1, the rise in LD temperature is suppressed. When the temperature difference between the mode hop occurrence temperature and the LD temperature at the start of the write operation is small, the write operation in which there are an increased number of skipped sectors is effective.

Note that the skipping write 1 and skipping write 2 above-described, may as well be operated as follows. That is, when the write operation is temporarily stopped, the data of the sectors that cannot be written is not written to the magnetic disk 12 in the next rotation, but temporarily stored in the memory (flash memory) 47 or the media cache area of the magnetic disk 12. In this case, the data saved in the memory 47 or the media cache area can be moved by executing a write operation onto the magnetic disk 12 when the HDD 10 is in an idle state or the like.

(Write Operation According to Write Duty)

Figure 13:
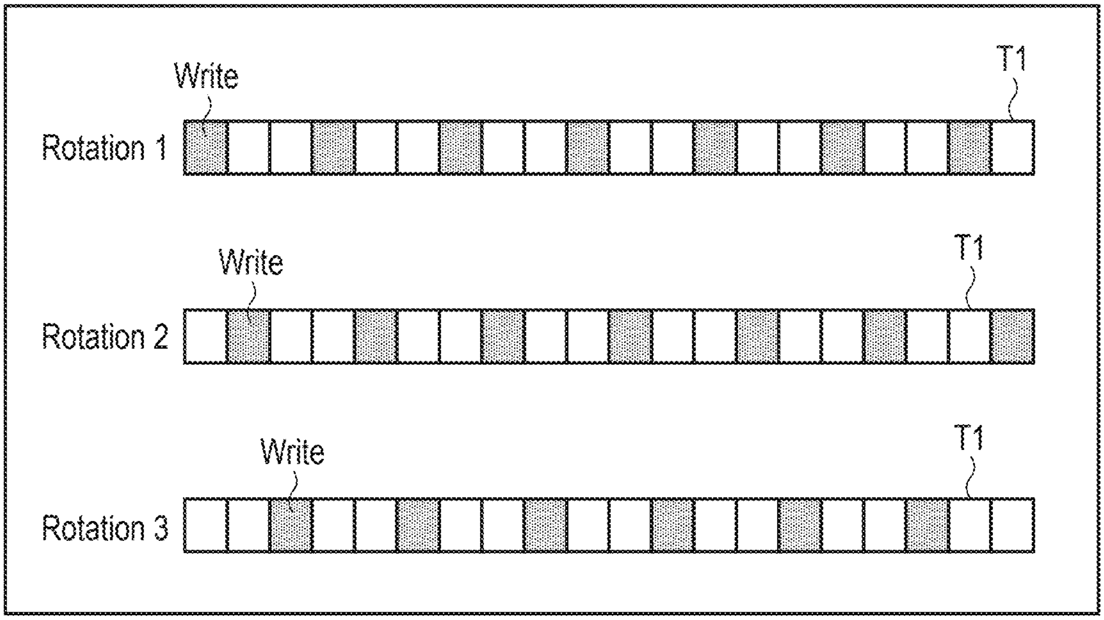
FIG. 13 is a plan view schematically showing the recording track in sector-skipping write.

FIG. 13 is a diagram showing the relationship between the LD temperature change and the sector position in an example of write operations according to a write duty, that is, a normal write (write duty 100%)+skipping write (write duty 50%). Here, the write duty indicates the ratio of the number of sectors used for data writing to the total number of sectors in one track.

In this write operation, the main controller 40 manages the degree of increase in LD temperature due to the write operation and the degree of decrease in LD temperature due to pausing the write operation based on the temperature management table, as detected by the detection circuit 46*d*. The main controller 40 calculates the cumulative increase in LD temperature from the start of the write operation using the determination circuit 46*e*, compares the cumulative value with the mode hop occurrence temperature in the temperature management table, and manages the write duty such that the cumulative value will not reach the mode hop occurrence temperature.

Figure 14:
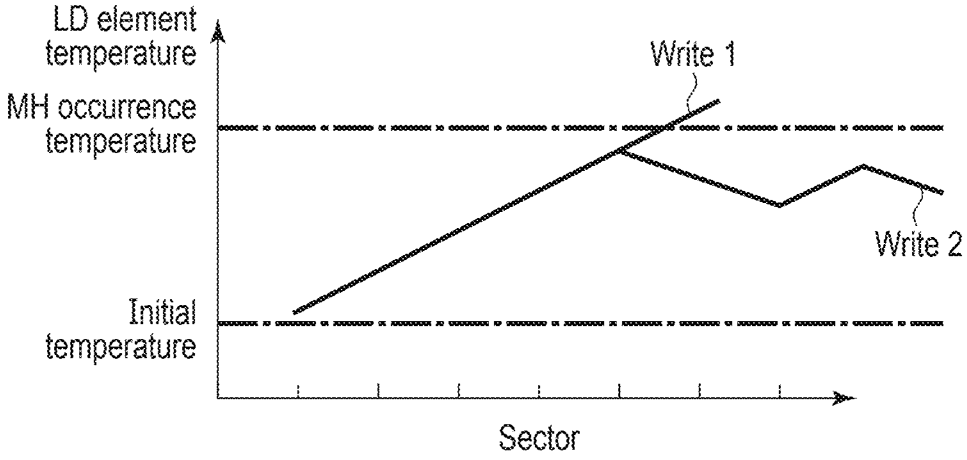
FIG. 14 is a diagram showing the relationship between the light source, the temperature of the light-emitting elements, and the recording sectors in write operation by write duty

As shown in FIG. 14, when the LD temperature at the start of write operation (initial temperature) is sufficiently lower than the mode hop (MH) occurrence temperature, for example, when the temperature difference is 1° C. or more, the main controller 40 selects write operations corresponding to the write duty as the write operations for avoiding mode hop occurrence, and executes the write operation (solid line, write 1 and write 2).

In one example, the main controller 40 performs continuous sector write (write duty 100%) until just before the mode hop occurrence temperature is reached, and then pauses the write operation or performs a write operation with reduced write duty just before reaching the temperature.

In the example shown in FIG. 14, the main controller 40 executes the normal write operation (write duty 100%) from the start of the write operation until just before reaching the mode hop occurrence temperature, as indicated by the solid line and the write 1, and writes the recording data to all the consecutive sectors. Then, the main controller 40 switches the write operation to a skipping write (for example, write duty 50%) just before the LD temperature reaches the mode hop occurrence temperature, and executes the write operation as indicated by the solid line and the write 2.

In the above-described write operation as well, the write duty can be managed so that the LD temperature does not reach the mode hop occurrence temperature, thereby making it possible to suppress the occurrence of the mode hopping.

Note that the skipping write 1 and skipping write 2 described above are included in the write operation corresponding to the write duty.

(Preheat, Write Operation)

Figure 15:
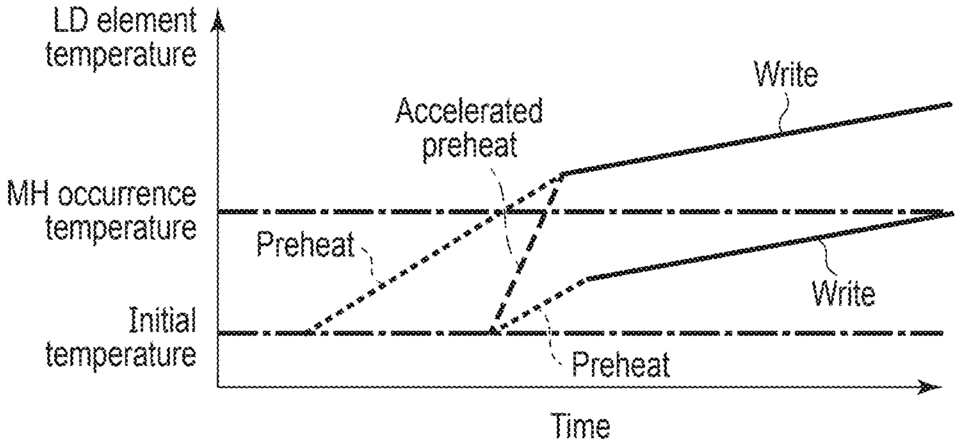
FIG. 15 is a diagram showing the relationship between the light source, the temperature of the light-emitting elements, and the recording sectors during preheating.
Figure 16:
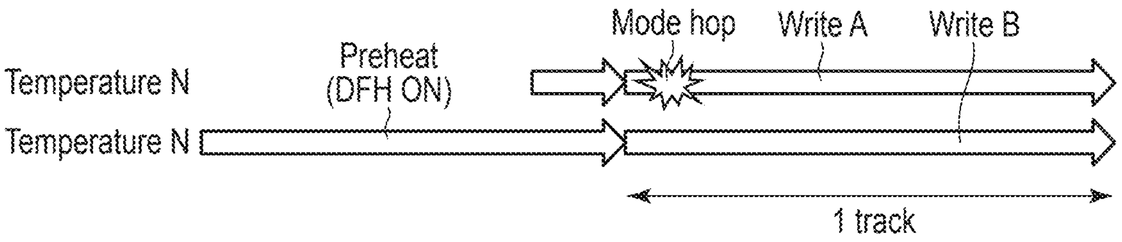
FIG. 16 is a diagram showing comparison between write operation without preheating and write operation with preheating.

FIG. 15 is a diagram showing the state of change in LD temperature due to preheating and write operation. FIG. 16 is a diagram showing a comparison between a write operation without preheating and write operation with preheating.

As indicated by write A in FIG. 16, in the case where mode hopping occurs immediately after the start of a write operation, it is necessary to heat the laser irradiation device LD in advance (preheat) to raise the LD temperature to a temperature at which mode hopping does not occur. As indicated by write B, by extending the preheat time and starting the write operation after raising the LD temperature sufficiently high, it is possible to suppress the occurrence of mode hopping.

The preheating of the laser irradiation device LD can be performed, for example, by heating the laser irradiation device LD using the first heater 76*a* and the second heater 76*b* of the magnetic head 16. Or, the preheating of the laser irradiation device LD can be performed by applying a voltage to the heat resistance sensor HR to generate heat.

An example of a specific write operation will now be described.

When the write operation starts, the detection circuit 46*d* of the main controller 40 detects the LD temperature (initial temperature) of the laser irradiation device LD measured by the bolometer MT and sends it to the determination circuit 46*e*. The determination circuit 46*e* compares the mode hop occurrence temperature stored in the temperature management table stored in the memory 47 with the initial LD temperature, and determines whether or not the initial LD temperature is close to the mode hop occurrence temperature. That is, the determination circuit 46*e* calculates the temperature difference between the initial LD temperature and the mode hop occurrence temperature, and when the temperature difference falls within a predetermined range, such as within approximately 0° C. (within 0.01° C.), it determines that the initial LD temperature is close to the mode hop occurrence temperature and sends the determination result to the setting circuit 46*f*. When the initial LD temperature is close to the mode hop occurrence temperature, the setting circuit 46*f* of the main controller 40 selects a preheat from the temperature management table as the write operation for avoiding the occurrence of mode hopping, and sets the preheat operation and the target preheat temperature.

When the preheat operation is set, as shown in FIG. 15, the main controller 40 applies a drive voltage to, for example, the first heater 76*a* and the second heater 76*b*, and preheats the laser irradiation device LD by these heaters. The main controller 40 monitors the LD temperature via the detection circuit 46*d*, and at the time when the LD temperature reaches the target preheating temperature, it stops the preheat operation and starts the write operation. That is, the light source control unit 46*g* of the main controller 40 supplies drive power to the LDU 25 from the light source drive power supply circuit 30*e*. The write control unit 46*a* applies a recording current to the write head 58 from the recording current supply circuit 30*a*.

As described above, by starting the write operation in the state where the LD temperature is raised to a temperature higher than the mode hop occurrence temperature through preheating, the occurrence of mode hopping can be suppressed.

Note that the preheating may as well be an accelerated (extended) preheat in which a heater drive voltage higher than the heater drive voltage during the normal write operation is applied to the first heater 76*a* and the second heater 76*b*. By setting to the accelerated preheat, the preheat time can be shortened. In the accelerated preheat, at the time when the LD temperature reaches the target preheat temperature, the high heater drive voltage is set back to the normal heater drive voltage, and the flying amount of the magnetic head is adjusted to the normal flying amount for the write operation.

As described above, the preheat may as well be performed by applying a voltage to the heat resistance sensor HR to make it generate heat. Since the heat generated by the heat resistance sensor HR does not substantially affect the flying amount of the magnetic head 16, it is possible to easily control the preheat operation.

According to the HDD of the present embodiment configured as described above, the temperature during write operation is managed so that the LD temperature does not reach the mode hop occurrence temperature, and thus the occurrence of mode hopping can be suppressed during write operation. Therefore, there is no need to set a write width margin due to occurrence of mode hopping, and the track pitch in the recording area of a magnetic disk can be reduced. Thus, it is possible to increase the recording density of the magnetic recording device.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, the number of write pause sectors in the skipping write operation is not limited to every other sector or every two sectors, but may be set to every three sectors or more. The number of skipped sectors may be set according to the write duty.

The materials, shapes, and sizes of the elements constituting the magnetic head and the laser irradiation device LD may be changed as necessary. In the magnetic recording device, the number of magnetic disks and the number of magnetic heads may be increased or decreased as necessary. The size of the magnetic disks may be selected from various options.

What is claimed is:

1. A magnetic recording device comprising:

a disk-shaped recording medium;

a magnetic head including a laser irradiation device including a light source which emits a laser, a waveguide, and a light-emitting element, which irradiates the laser onto a recording area of the recording medium, a recording element which writes recording data onto the recording area of the recording medium, and a temperature sensor which detects a temperature of the laser irradiation device; and a controller including a temperature management table storing a correspondence relationship between the temperature of the laser irradiation device, a mode hop occurrence temperature and a mode hop occurrence location, at which mode hopping occurs in a laser output, which manages a write operation of the laser irradiation device and the magnetic head according to the temperature management table, wherein the controller comprises a detection circuit which detects an initial temperature of the laser irradiation device at start of the write operation, a determination circuit which determines a temperature difference between the initial temperature and the mode hop occurrence temperature in the temperature management table, a setting circuit which sets a write operation in which the temperature of the laser irradiation device does not reach the mode hop occurrence temperature based on the temperature difference and the temperature management table, and a light source control unit and a light control unit which execute the set write operation, the recording medium includes a plurality of tracks each containing a plurality of consecutive sectors, and the temperature management table includes a plurality of write operation modes each recording a respective correspondence relationship between a mode hop occurrence temperature and a mode hop occurrence sector position.

2. The device of claim 1, wherein when a ratio of the number of sectors subjected to write to the total number of sectors in one track is referred to as a write duty, the setting circuit sets a write operation of the write duty, in which the temperature of the laser irradiation device does not reach the mode hop occurrence temperature.

3. The device of claim 2, wherein the setting circuit sets, when the temperature difference is large, a write operation mode in which the write operation is executed at a write duty of 100% until the temperature of the laser irradiation device rises to a temperature immediately before the mode hop occurrence temperature from the initial temperature, and then the write operation is executed at a reduced write duty immediately before the mode hop occurrence temperature, or the write operation is paused.

4. The device of claim 2, wherein the setting circuit sets, when the temperature difference is within a predetermined range, a skipping write operation mode by which the write operation is executed by thinning sectors.

5. The device of claim 4, wherein in the skipping write operation, the controller repeatedly executes, in a first rotation of the recording medium, write to one or a plurality of sectors in one track, and pause to a next one or a plurality of sectors, and in a second rotation, execute write to sectors that are not written in the first rotation.

6. The device of claim 5, wherein in the skipping write operation, the controller applies a write drive voltage that causes the light source to emit a laser during the write of the sector, and applies a drive voltage that does not cause the light source to emit a laser during a part or a entirely of a zone of the write pause, or stops the applying of the voltage.

7. The device of claim 4, wherein the controller includes a memory, and in the skipping write operation, the controller repeatedly executes, in a first rotation of the recording medium, write to one or a plurality of sectors in one track, and write pause to a next one or a plurality of sectors, and after the first rotation, stores recording data that is not written to the sectors by the write pause, to the memory.

8. The device of claim 1, wherein when the temperature difference is at a predetermined value or less, the setting circuit sets a write operation mode in which the magnetic head is preheated until the temperature of the laser irradiation device exceeds the mode hop occurrence temperature, and then executes the write operation.

9. The device of claim 8, wherein the magnetic head includes a heater, and the controller includes a heater control unit which applies a drive voltage to the heater during preheating, and heats the laser irradiation device by the heater.

* * * * *